Sept. 13, 1932.  J. W. ANDERSON  1,876,574
METHOD AND DEVICE FOR MANUFACTURING WINDSHIELD WIPER BLADES
Filed April 6, 1931
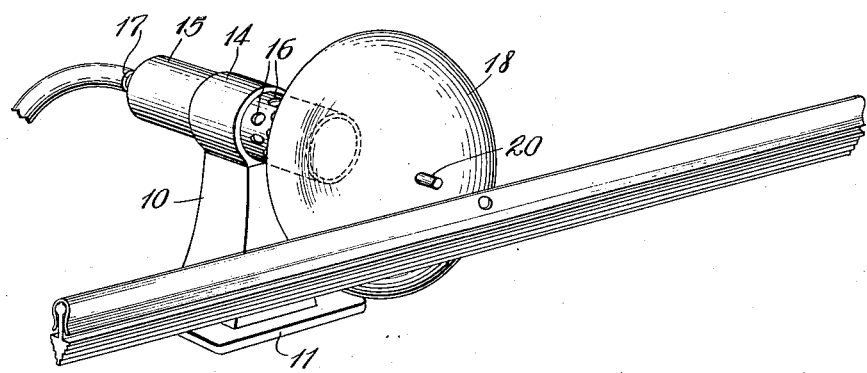
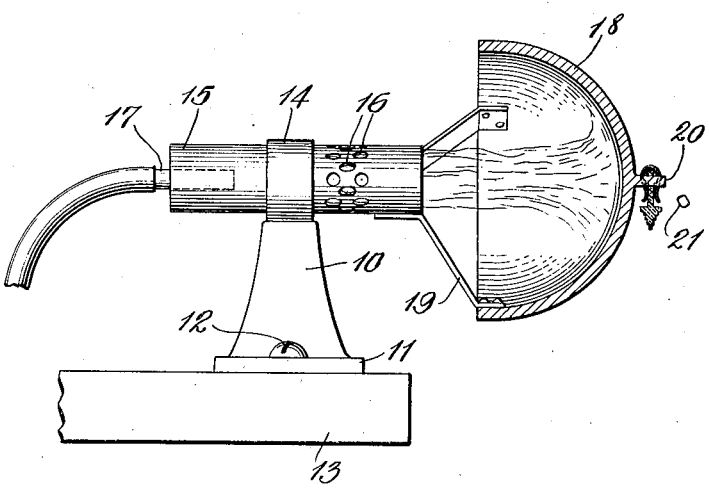
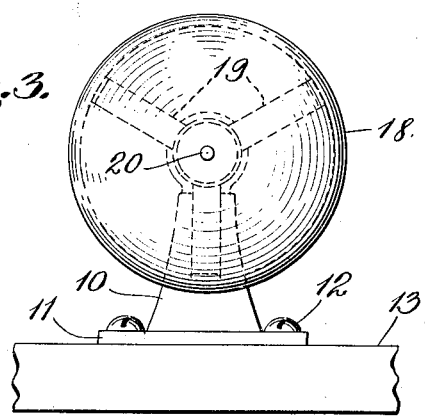
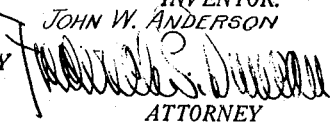
INVENTOR.
JOHN W. ANDERSON
BY
ATTORNEY Patented Sept. 13, 1932

1,876,574

UNITED STATES PATENT OFFICE

JOHN W. ANDERSON, OF GARY, INDIANA

METHOD AND DEVICE FOR MANUFACTURING WINDSHIELD WIPER BLADES

Application filed April 6, 1931. Serial No. 527,936.

There have heretofore been generally used in vehicles, windshield wiper blades having a metal holder of channel form, in the channel of which holder a wiper strip of flexible rubber has been secured. In order to secure the holder to the clip and the reciprocating arm of the wiper, there has been provided a hole passing completely through the blade, which hole extends through the side walls of the channel shape holder and through the rubber wiping strip. A cotter pin or screw passes through the side walls of the clip and through the hole in the blade, thus attaching the clip and blade together.

Two methods have been employed to perforate the hole in the wiper strip. According to one a hole is punched in the rubber wiping strip before its assembly in the holder, to correspond with the holes in the side walls of the holder. Where this method is used great care must be taken in assembling the rubber in the holder so that the hole in the rubber and the holes in the holder will properly register. If, as frequently occurs, the hole in the rubber does not register with the holes in the side walls of the holder, the wiper strip will be pulled out of shape when the cotter pin or screw is forced through the wiper strip, which distortion results in the wiping edge of the wiping strip being drawn out of true, so that the wiping strip will not function efficiently. The second method of forming the hole in the wiper strip is to first assemble the strip in unperforated condition in the holder and then punch the hole through the wiper strip. This method also produces distortion of the wiping strip as the punch passes therethrough, which distortion draws the wiping edge of the strip out of true so that it will not perform its wiping function efficiently. Distortion of the holder also occurs in the punching operation.

The method of the present invention comprises the steps of first assembling the wiper strip in a holder having registering holes in its side walls and then perforating the rubber strip by pushing therethrough a punch heated to a sufficiently high temperature to cause the rubber to melt and a slug to be ejected therefrom without sufficient strain being imposed on the strip to produce distortion of its wiping edge or distortion of the holder. The heat of the punch acts to effect additional vulcanization around the inside of the hole through the rubber strip and thus produce a more rugged and durable windshield wiper blade.

An object of the present invention is to provide a method of the character indicated whereby more efficient and durable windshield wiper blades may be more expeditiously and economically manufactured than by the methods heretofore known.

A further object of the invention is to provide a device enabling the perforation in windshield wiper blades to be expeditiously and economically formed without distortion of the wiping edge of the wiping strip.

The invention claimed is hereinafter fully set forth.

In the drawing,

Fig. 1 is a perspective view showing the improved device for perforating the rubber strips of windshield wiper blades, a windshield wiper blade being shown in the position it occupies just prior to having the heated punch pass through the rubber strip to perforate the same;

Fig. 2, a view of the device partially in side elevation and partially in vertical longitudinal central section, the windshield wiper blade being shown with the punch passing through the rubber strip, and the slug removed by the punch, being shown falling from the blade; and Fig. 3, an end elevation of the perforating device.

In the practice of the invention, referring descriptively to the specific embodiment thereof illustrated in the accompanying drawing, the perforating device comprises a standard 10 mounted on a flat base plate 11, having suitable holes therethrough for the reception of screws 12 by which the base plate is fastened to the top 13 of a suitable support. Mounted on the standard is a cylindrical sleeve 14 in which is fitted a cylindrical tube 15. The tube 15 is closed at its rear end and open at its front end, and is provided near its front end with a plurality of perforations 16 for the admission of air. A gas pipe 17 leads through the closed end of the tube for the purpose of delivering to the tube a suitable supply of inflammable gas. Disposed in front of the open end of the tube and spaced therefrom is a semi-cylindrical shell or baffle 18 which baffle is attached to the front end of the tube by means of three brackets 19. Centrally disposed of the outer surface of the shell is a punch in the form of a short tip or lug 20 adapted when heated to perforate the rubber strip of a wiper blade, without distorting its wiping edge.

From the foregoing description, it will be obvious that the perforating device operates in the following manner. A suitable supply of inflammable gas is admitted to the tube 15 through the pipe 17 and the gas escaping from the front or nozzle end of the tube is ignited, producing a flame which impinges on the inner face of the semi-spherical baffle, heating the shell and punching lug 20 to a sufficient degree so that the punch will melt the rubber of the wiping strip and readily remove a slug 21 therefrom without distorting the strip, and at the same time will effect additional vulcanization of the walls of the hole formed by removal of the slug.

In practicing the method, the rubber strips are first assembled in a metal holder having registering perforations through its side walls. The holder is then advanced by the operator toward the punch 20 of the perforating device so that the heated punch enters the hole through one of the side walls of the holder, then melts a slug 21 from the rubber strip and pushes the same out through the hole at the other side of the holder.

While one of the preferred methods for practicing the invention has been fully set forth, and one of the preferred forms of device for practicing the method has been disclosed, it is to be understood that various changes both in the procedure of the method, and in the form, material, and assembly of the parts of the device, may be resorted to without departing from the spirit and scope of the invention as defined in the appended claims.

The invention claimed and desired to be secured by Letters Patent is:

1. The method of manufacturing windshield wiper blades, which comprises the steps of assembling a rubber wiping strip in the channel of a metal holder having registering perforations in its side walls; and passing a heated punch through the perforations in one of the side walls of the holder and into contact with the wiper strip so as to melt the same and push a slug therefrom out through the hole in the opposite side wall of the holder.

2. The method of manufacturing windshield wiper blades, which comprises the steps of assembling a rubber windshield wiper strip in a metal holder having registering perforations in its side walls; heating a punch to sufficient temperature to melt the rubber of the strip when brought in contact therewith, relatively moving the punch and the blade so that the punch will pass through the perforation in one of the side walls of the holder of the blade and form a perforation through the wiper strip by melting the rubber of said strip.

3. The method of manufacturing windshield wiper blades which comprises the steps of assembling a rubber windshield wiper strip in a metal holder having registering perforations in its side walls; heating a punch to sufficient temperature to melt the rubber of the strip when brought in contact therewith, relatively moving the punch and the blade so that the punch will pass through the perforation in one of the side walls of the holder of the blade and form a perforation through the wiper strip by melting a slug of rubber therefrom and push the slug out through the perforation in the opposite wall of the holder.

In testimony whereof, I have signed this specification.

JOHN W. ANDERSON.